US012459515B2

(12) United States Patent
Kanesaka et al.

(10) Patent No.: US 12,459,515 B2
(45) Date of Patent: Nov. 4, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Masashi Kanesaka, Tokyo (JP); Yuma Yoshida, Tokyo (JP); Daichi Kato, Tokyo (JP); Haruhiko Nishiguchi, Tokyo (JP); Akio Futatsudera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 18/588,004

(22) Filed: Feb. 27, 2024

(65) Prior Publication Data

US 2024/0317233 A1 Sep. 26, 2024

(30) Foreign Application Priority Data

Mar. 22, 2023 (JP) ................................. 2023-045912

(51) Int. Cl.
B60W 30/18 (2012.01)
B60W 10/20 (2006.01)
B60W 50/14 (2020.01)

(52) U.S. Cl.
CPC ...... B60W 30/18163 (2013.01); B60W 10/20 (2013.01); *B60W 2050/146* (2013.01)

(58) Field of Classification Search
CPC .......... B60W 30/18163; B60W 10/20; B60W 2050/146; B60W 50/14

(Continued)

(56) References Cited

U.S. PATENT DOCUMENTS

2019/0276048 A1* 9/2019 Suzuki .................... H04W 4/40
2020/0198648 A1 6/2020 Ishioka et al.
(Continued)

FOREIGN PATENT DOCUMENTS

JP 2018-203011 12/2018
JP 2019-161407 9/2019
(Continued)

OTHER PUBLICATIONS

Japanese Notice of Allowance for Japanese Patent Application No. 2023-045912 mailed Sep. 17, 2024.

*Primary Examiner* — Yi-Kai Wang
(74) *Attorney, Agent, or Firm* — Amin, Turocy & Watson, LLP

(57) ABSTRACT

A vehicle control device includes a recognizer configured to recognize a surrounding situation of a vehicle, a driving controller configured to execute driving control for controlling one or both of steering and a speed of the vehicle, an incoming call determiner configured to determine presence or absence of an incoming call for an occupant of the vehicle, and a notification controller configured to notify the occupant of information about an operation of the vehicle based on the driving control and information about the incoming call in a mode corresponding to a state of the driving control. The driving controller determines whether or not to make a lane change from a travel lane of the vehicle to an adjacent lane on the basis of a degree of progress of the control if the incoming call is present when control related to the lane change of the vehicle is executed.

11 Claims, 9 Drawing Sheets

(58) Field of Classification Search
USPC .......................................................... 701/41
See application file for complete search history.

(56) References Cited

U.S. PATENT DOCUMENTS

2020/0207363 A1* 7/2020 Deshpande ....... B60W 50/0098
2021/0284164 A1   9/2021 Hirosawa et al.

FOREIGN PATENT DOCUMENTS

| JP | 2020-100258 | 7/2020 |
| JP | 2020-135195 | 8/2020 |
| JP | 2021-146766 | 9/2021 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-045912, filed Mar. 22, 2023, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems have been increasingly active in consideration of vulnerable individuals among participants in transportation. In pursuit of this realization, research and development on automated driving technology are being emphasized to further improve the safety and convenience of transportation. In relation to this, technology for controlling whether or not to execute lane change control according to whether or not a user is on the phone and causing a display to display an image indicating the occurrence of an event accompanied by a change in behavior of a vehicle executed by an automated driving controller at a timing before the behavior of the vehicle changes is known (for example, Japanese Unexamined Patent Application, First Publication Nos. 2020-135195 and 2018-203011).

SUMMARY

Meanwhile, in automated driving technology, vehicle control and a notification mode for an occupant of a vehicle when there is an incoming call for the occupant before a lane change has not been considered. Therefore, there is a problem that appropriate vehicle control based on the timings of lane changes and incoming calls may not be possible.

In order to solve the above problems, an objective of the present application is to provide a vehicle control device, a vehicle control method, and a storage medium capable of more appropriately performing a vehicle control process when there is an incoming call for an occupant during a lane change of a vehicle. In turn, it will contribute to the development of a sustainable transportation system.

A vehicle control device, a vehicle control method, and a storage medium according to the present invention adopt the following configurations.

(1): According to an aspect of the present invention, there is provided a vehicle control device including: a recognizer configured to recognize a surrounding situation of a vehicle; a driving controller configured to execute driving control for controlling one or both of steering and a speed of the vehicle on the basis of the surrounding situation; an incoming call determiner configured to determine presence or absence of an incoming call for an occupant of the vehicle; and a notification controller configured to notify the occupant of information about an operation of the vehicle based on the driving control and information about the incoming call in a mode corresponding to a state of the driving control, wherein the driving controller determines whether or not to make a lane change from a travel lane of the vehicle to an adjacent lane on the basis of a degree of progress of the control if the incoming call is present when control related to the lane change of the vehicle is executed.

(2): In the above-described aspect (1), the driving controller suppresses the lane change of the vehicle if the degree of progress is less than a threshold value when the incoming call is present.

(3): In the above-described aspect (2), the degree of progress is set on the basis of an amount of change in behavior of the vehicle.

(4): In the above-described aspect (2), the degree of progress is set on the basis of a degree of steering control for the lane change.

(5): In the above-described aspect (1), the notification controller causes a display to display a third image for providing a notification of the incoming call after an image is switched from a first image indicating the operation of the vehicle to a second image indicating that the lane change is suppressed and the second image is displayed when the driving controller determines that the lane change is not made after the first image is displayed on the display according to control related to the lane change of the vehicle, and switches the image from the first image to the third image when it is determined that the lane change is made to cause the display to display the third image.

(6): In the above-described aspect (1), the notification controller provides a notification of an image indicating the operation of the vehicle and an image for providing a notification of the incoming call using a plurality of displays including a first display and a second display, and, when the driving controller determines not to make the lane change after a first image indicating the operation of the lane change is displayed on the first display and the second display, the notification controller causes the first display to display a second image and causes the second display to display a third image.

(7): In the above-described aspect (1), the notification controller provides a notification of an image indicating the operation of the vehicle and an image for providing a notification of the incoming call using a plurality of displays including a first display and a second display, and, when the driving controller determines to make the lane change after a first image indicating the operation of the lane change is displayed on the first display and the second display, the notification controller causes the first display to continuously display the first image and causes the second display to display a third image.

(8): In the above-described aspect (2), the driving controller does not suppress the lane change even if the degree of progress is less than a threshold value when the incoming call is present in a case where the vehicle is guided along a route for a destination and makes the lane change.

(9): In the above-described aspect (2), the notification controller performs calling control for the incoming call regardless of the degree of progress when a degree of importance of the incoming call is greater than or equal to a threshold value.

(10): According to an aspect of the present invention, there is provided a vehicle control method including: recognizing, by a computer, a surrounding situation of a vehicle; executing, by the computer, driving control for controlling one or both of steering and a speed of the vehicle on the basis of the surrounding situation; determining, by the computer, presence or absence of an incoming call for an occupant of the vehicle; notifying, by the computer, the occupant of information about an operation of the vehicle based on the driving control and information about the incoming call in a mode corresponding to a state of the driving control; and determining, by the computer, whether or not to make a lane change from a travel lane of the vehicle to an adjacent lane on the basis of a degree of progress of the control if the incoming call is present when control related to the lane change of the vehicle is executed.

(11): According to an aspect of the present invention, there is provided a computer-readable non-transitory storage medium storing a program for causing a computer to: recognize a surrounding situation of a vehicle; execute driving control for controlling one or both of steering and a speed of the vehicle on the basis of the surrounding situation; determine presence or absence of an incoming call for an occupant of the vehicle; notify the occupant of information about an operation of the vehicle based on the driving control and information about the incoming call in a mode corresponding to a state of the driving control; and determine whether or not to make a lane change from a travel lane of the vehicle to an adjacent lane on the basis of a degree of progress of the control if the incoming call is present when control related to the lane change of the vehicle is executed.

According to the above-described aspects (1) to (11), it is possible to more appropriately perform a vehicle control process when there is an incoming call for an occupant during a lane change of a vehicle.

DESCRIPTION OF EMBODIMENTS

Hereinafter, embodiments of a vehicle control device, a vehicle control method, and a storage medium of the present invention will be described with reference to the drawings. Hereinafter, an embodiment in which the vehicle control device is applied to an automated driving vehicle will be described as an example. For example, automated driving is a process of executing driving control by automatically controlling one or both of steering and a speed of the vehicle. For example, the driving control may include various types of driving control such as a lane keeping assistance system (LKAS), auto lane changing (ALC), adaptive cruise control (ACC), and a collision mitigation brake system (CMBS). The driving control may include driving assistance control such as an advanced driver assistance system (ADAS). In the automated driving vehicle, the driving may be controlled according to manual driving of an occupant (driver) for at least a part of steering and a speed of a vehicle.

[Overall Configuration]

Figure 1:
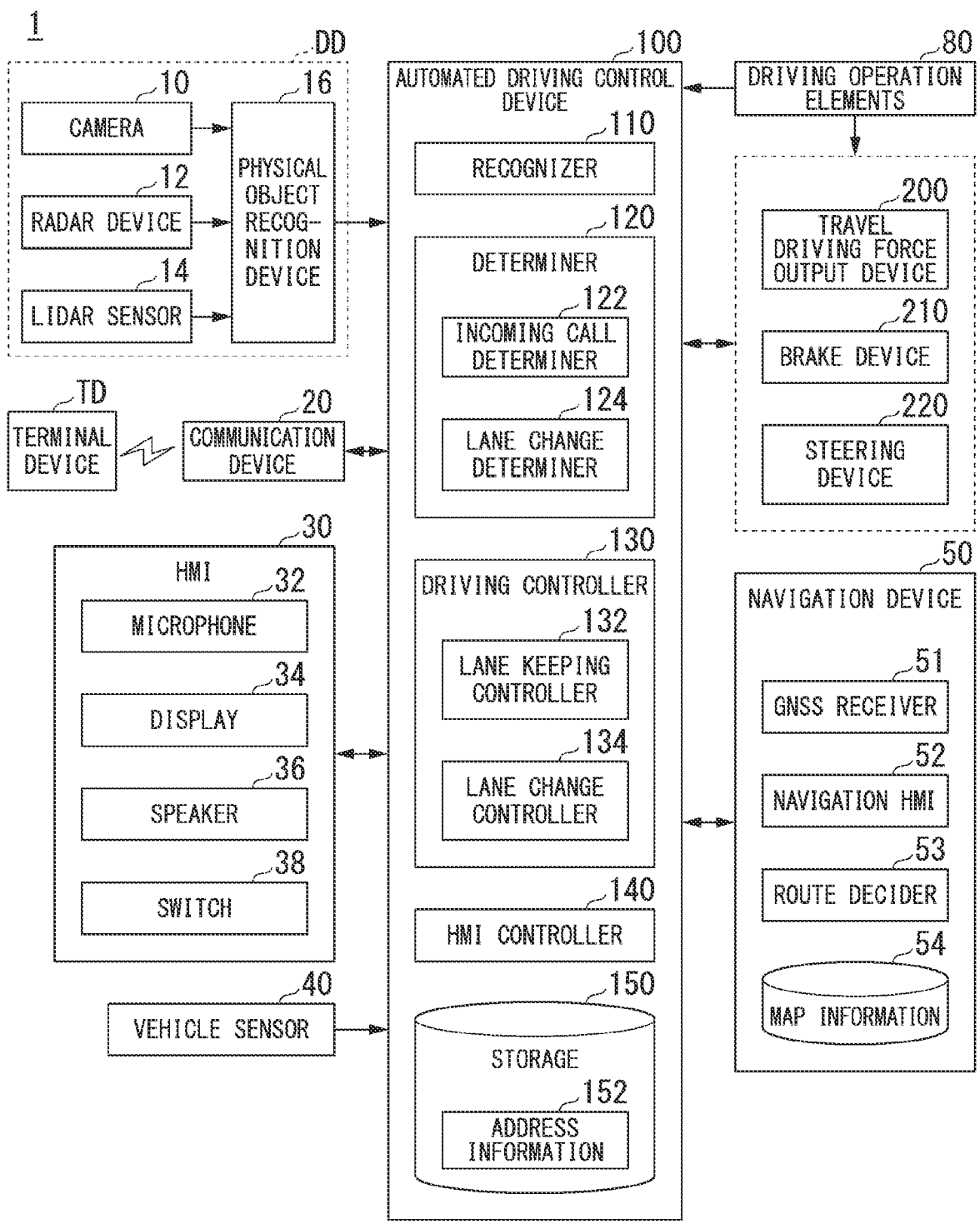
FIG. 1 is a configuration diagram of a vehicle system including a vehicle control device according to an embodiment.

FIG. 1 is a configuration diagram of a vehicle system 1 including the vehicle control device according to the present embodiment. A vehicle (hereinafter referred to as a vehicle M) in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery (power storage) or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The automated driving control device 100 is an example of a "vehicle control device." A combination of the camera 10, the radar device 12, the LIDAR sensor 14, and the physical object recognition device 16 is an example of a "detection device DD." The HMI 30 is an example of a "notifier."

For example, the camera 10 is a digital camera using a solid-state imaging element such as a charge-coupled device (CCD) or a complementary metal oxide semiconductor (CMOS). The camera 10 is attached to any location on the vehicle M in which the vehicle system 1 is mounted. For example, when the view in front of the vehicle M is imaged, the camera 10 is attached to an upper part of a front windshield, a rear surface of a rearview mirror, a front part of a vehicle body, or the like. When the view to the rear of the vehicle M is imaged, the camera 10 is attached to an upper part of a rear windshield, a back door, or the like. When the views to the side of the vehicle M are imaged, the camera 10 is attached to a door mirror, or the like. For example, the camera 10 periodically and iteratively images the surroundings of the vehicle M. The camera 10 may be a stereo camera. The camera 10 may include an in-cabin camera that images an occupant (a driver or the like) in the cabin. In this case, the in-cabin camera periodically and iteratively captures images of the cabin.

The radar device 12 radiates radio waves such as millimeter waves around the vehicle M and detects at least a position (a distance to and a direction) of a physical object by detecting radio waves (reflected waves) reflected by the physical object near the vehicle M. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results of some or all of the camera 10, the radar device 12, and the LIDAR sensor 14 and recognizes a position, type, speed, and the like of a physical object near the vehicle M. Examples of the physical object include other vehicles (for example, nearby vehicles within a predetermined distance from the vehicle M), pedestrians, bicycles, road structures, and the like. The road structures include, for example, road signs, traffic signals, railroad crossings, curbs, median strips, guardrails, fences, and the like. The road structure may include, for example, road surface signs such as road markings (hereinafter simply referred to as "markings") drawn on or affixed to the road surface, pedestrian crossings, bicycle crossings, and stop lines. The physical object recognition device 16 outputs a recognition result to the automated driving control device 100. The physical object recognition device 16 may output detection results of the camera 10, the radar device 12, and the LIDAR sensor 14 to the automated driving control device 100 as they are. In this case, the physical object recognition device 16 may be omitted from the configuration of the vehicle system 1 (specifically, the detection device DD). The physical object recognition device 16 may be included in the automated driving control device 100.

The communication device 20 communicates with another vehicle located in the vicinity of the vehicle M, a smartphone or a tablet terminal used by the occupant of the vehicle M, various types of server devices, or the like using, for example, a cellular network, a Wi-Fi network, Bluetooth (registered trademark), dedicated short-range communication (DSRC), a local area network (LAN), a wide area network (WAN), a network such as the Internet, or the like. For example, the communication device 20 can perform calling with an external partner or the like via a terminal device TD having a calling function by performing pairing communication with the terminal device TD. In this case, a sound input/output for calling is performed using the microphone 32 or the speaker 36 provided in the HMI 30 according to the control of the HMI controller 140 to be described below. The camera 10 and the display 34 may be used to input and output an image (moving image) at the time of calling.

The HMI 30 outputs various types of information to the occupant of the vehicle M and receives input operations by the occupant. The HMI 30 includes, for example, a microphone 32, a display 34, a speaker 36, and a switch 38. The HMI 30 may include a buzzer, a key, a lever, or the like. The microphone 32 is a sound collector that collects a sound produced in the cabin. The microphone 32 may be provided, for example, at one or more representative positions in the cabin or may be provided in each of the driver's seat, the passenger seat, and the rear seat. The display 34 is a device (or a group of devices) capable of displaying an image and receiving input operations. The display 34 includes, for example, a display device configured as an input/output touch panel. The display 34 may include one or more displays. The display 34 may be provided, for example, at one or more representative positions in the cabin (for example, the central portion of the instrument panel or the meter display), and may be provided in each of the driver's seat, the passenger seat, and the rear seat. Furthermore, the display 34 may include a head up display (HUD) and a mechanical input device. One or more speakers 36 are arranged in the cabin and output sounds, alarms, and the like. The switch 38 may include an operation changeover switch that mutually switches between automated driving and manual driving by the occupant, an ON/OFF switch for switching whether or not to execute driving control, and a turn signal switch (direction indicator). The turn signal switch is provided, for example, on a steering column or on a steering wheel. The turn signal switch is, for example, an example of an operator that receives an instruction from the occupant to change the lane of the vehicle M. The switch 38 may include a switch for starting or ending calling during calling with an external partner via the communication device 20.

The vehicle sensor 40 includes a vehicle speed sensor configured to detect the speed of the vehicle M, an acceleration sensor configured to detect acceleration, a yaw rate sensor configured to detect a yaw rate (for example, a rotational angular velocity around a vertical axis passing through the center of gravity of the vehicle M), a direction sensor configured to detect the direction of the vehicle M, and the like. The vehicle sensor 40 may include a position sensor configured to detect the position of the vehicle M. The position sensor is, for example, a sensor configured to acquire position information (longitude/latitude information) from a Global Positioning System (GPS) device. The position sensor may be a sensor configured to acquire position information using the global navigation satellite system (GNSS) receiver 51 of the navigation device 50. A detection result of the vehicle sensor 40 is output to the automated driving control device 100.

For example, the navigation device 50 includes the GNSS receiver 51, a navigation HMI 52, and a route decider 53. The navigation device 50 stores map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the map information 54. The map information 54 is, for example, information in which a road shape is expressed by a link indicating a road associated with position information and nodes connected by the link. The map information 54 may include curvature of a road, point of interest (POI) information, and the like. The map information 54 may include, for example, information about a center of a lane, information about a boundary of the lane (a road marking), the number of lanes, a width of a lane, a road gradient, and the like or may include road information, traffic regulation information, address information (address/postal code), facility information, telephone number information, and the like. The map information 54 may be updated at any time by the communication device 20 communicating with other devices. The map information 54 may be stored in the storage 150 of the automated driving control device 100 to be described below.

The navigation device 50 may provide route guidance using the navigation HMI 52 on the basis of the route on the map. The navigation device 50 may be implemented, for example, with a function of the terminal device TD. The navigation device 50 may transmit a current position and destination to the navigation server via the communication device 20 and acquire a route equivalent to the route on the map from the navigation server.

For example, the driving operation elements 80 include an accelerator pedal, a brake pedal, a shift lever, and other operation elements in addition to a steering wheel. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220. A steering wheel is an example of an "operation element that receives a steering operation by the driver." The operation element does not necessarily have to be annular, but may be in the form of a variant steering, a joystick, a button, or the like. The driving operation element 80 outputs a steering angle and an amount of steering torque when the driver of the vehicle M has steered the steering wheel in a predetermined direction, information indicating that it is detected that the driver has gripped the steering wheel, and the like to the automated driving control device 100.

The automated driving control device 100, for example, includes a recognizer 110, a determiner 120, a driving controller 130, an HMI controller 140, and a storage 150. Each of the recognizer 110, the determiner 120, the driving controller 130, and the HMI controller 140 is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in an HDD or a flash memory of the automated driving control device 100 when the storage medium (the non-transitory storage medium) is mounted in a drive device. The HMI controller 140 is an example of a "notification controller."

The storage 150 may be implemented by the above-described various types of storage devices, a solid-state drive (SSD), an electrically erasable programmable read-only memory (EEPROM), a read-only memory (ROM), a random-access memory (RAM), or the like. The storage 150 stores, for example, address information 152, programs, and other various types of information. For example, the map information 54 may be stored in the storage 150. The address information 152 is, for example, information in which address information such as a telephone number is associated with a name. The address information may be associated with a priority for a name or telephone number. The address information 152 may have a name and a telephone number having a high degree of importance (or a high degree of urgency) registered in advance. The address information 152 may be acquired from the terminal device TD or may be set by the occupant of the vehicle M via the HMI 30.

The recognizer 110 recognizes a surrounding situation of the vehicle M on the basis of information input from an external field sensor DD. For example, the recognizer 110 recognizes a position of a physical object (for example, a relative position), a velocity (for example, a relative velocity), acceleration, and the like of a physical object located within a predetermined distance from the vehicle M on the basis of information input from the external field sensor DD. The physical object is, for example, a traffic participant such as another vehicle, a bicycle, or a pedestrian. The position of the physical object, for example, is recognized as a position on absolute coordinates having a representative point of the vehicle M (a center of gravity, a drive shaft center, or the like) as the origin, and is used for control. The position of the physical object may be represented by a representative point such as the center of gravity or a corner of the physical object or may be represented in a region. The "state" of the physical object may include the acceleration or jerk of the physical object, or the "action state" (for example, whether or not the lane is changing or is about to change). The recognizer 110 may recognize a type of physical object (another vehicle, a bicycle, or a pedestrian) or the like on the basis of feature information such as a size, a shape, and a color of a physical object.

The recognizer 110 recognizes, for example, a lane in which the vehicle M is traveling (a travel lane). For example, the recognizer 110 recognizes road markings (hereinafter referred to as "markings") on the left and right of the vehicle M from the camera image captured by the camera 10 and recognizes a travel lane on the basis of the position of the recognized marking. The recognizer 110 may recognize a travel lane by recognizing a physical object (a runway boundary or a road boundary) capable of identifying a lane position including a shoulder, a curb, a median strip, a guardrail, a fence, a wall, and the like as well as a marking. In this recognition, a position of the vehicle M acquired from the navigation device 50 or a processing result of the INS may be taken into account.

The recognizer 110 may recognize the current travel lane of the vehicle M with reference to the map information 54 on the basis of the position information of the vehicle M obtained from the vehicle sensor 40 or may recognize the travel lane by comparing a pattern of road markings (for example, an arrangement of solid lines and broken lines) obtained from the map information 54 with a pattern of road markings in the vicinity of the vehicle M recognized from an image captured by the camera 10. The recognizer 110 may recognize a road shape of the travel lane.

The recognizer 110 may recognize adjacent lanes adjacent to the travel lane of the vehicle M, a temporary stop line, an obstacle, red traffic light, a toll gate, and other road events.

When the travel lane is recognized, the recognizer 110 recognizes a position or an orientation of the vehicle M with respect to the travel lane. For example, the recognizer 110 may recognize the deviation of a reference point (a center or a center of gravity) of the vehicle M from the center of the lane and an angle formed between the travel direction of the vehicle M and a line connected to the center of the lane as a relative position and orientation of the vehicle M related to the travel lane. Alternatively, the recognizer 110 may recognize a position of the reference point of the vehicle M related to one side end portion (a road marking or a road boundary) of the travel lane or the like as a relative position of the vehicle M related to the travel lane.

The recognizer 110 implements, for example, a function of artificial intelligence (AI) and a function of a predetermined model in parallel. For example, an "intersection recognition" function may be implemented by executing intersection recognition based on deep learning or the like and recognition based on previously given conditions (signals, road signs, or the like, with which pattern matching is possible) in parallel and performing comprehensive evaluation by assigning scores to both recognitions.

The determiner 120 includes, for example, an incoming call determiner 122 and a lane change determiner 124. The incoming call determiner 122 determines the presence or absence of an incoming call for the driver of the vehicle M (or an occupant sitting in the driver's seat). The incoming call is, for example, an event that occurs in a state in which the terminal device TD receives an incoming call (a connection request from the other party) through a communication circuit such as a telephone circuit (hereinafter referred to as an incoming call event). If the incoming call ends without initiating the calling, or if the calling ends, the incoming call event also ends. The incoming call determiner 122, for example, determines the presence or absence of the incoming call event in a situation in which the driver's terminal device TD and the vehicle system 1 (the communication device 20) are being paired. When the vehicle M side (for example, the HMI 30 or the HMI controller 140) has a calling function, the presence or absence of an incoming call event for the driver registered in advance according to an input operation by the HMI 30 or the like is determined regardless of whether or not it is paired with the terminal device TD.

On the basis of the surrounding situation of the vehicle M recognized by the recognizer 110, the lane change determiner 124 determines whether or not it is necessary to make a lane change from the travel lane of the vehicle M to an adjacent lane according to driving control (automated driving control) by the driving controller 130 at a current point in time or in the future. For example, when a destination is set in advance, the lane change determiner 124 determines whether or not it is necessary to make a lane change according to driving control to move toward the destination at a travel point on the basis of a position of the vehicle M, a road shape during driving, and the like. For example, when the vehicle M reaches a position a predetermined distance before a branch point where a plurality of lanes are branched and the vehicle M is not traveling in a lane where movement is possible in a direction of the destination, the lane change determiner 124 determines that it is necessary to change lanes.

When the turn signal switch provided in the HMI 30 or the like is operated by the driver and there is an adjacent lane in a direction corresponding to the switch operation, the lane change determiner 124 may receive a lane change request and determine that it is necessary to change the lanes in the direction requested by the driver. The lane change determiner 124 may determine that it is necessary to change lanes when passing a preceding vehicle or when it is necessary to avoid an obstacle in front on the basis of the surrounding situation.

On the basis of the surrounding situation of the vehicle M recognized by the recognizer 110, the determination result of the determiner 120, and the like, the driving controller 130 controls one or both of the steering and speed of the vehicle M and executes driving control for the vehicle M. The driving controller 130 includes, for example, a lane keeping controller 132 and a lane change controller 134.

The lane keeping controller 132 controls the steering device 220 so that the vehicle M does not deviate from the travel lane. For example, the lane keeping controller 132 controls the steering device 220 so that the vehicle M travels in or near the center of the travel lane recognized by the recognizer 110. The lane keeping controller 132 may control the steering device 220 so that the vehicle M does not deviate from the travel lane and support the driver's steering operation. Hereinafter, this control may be referred to as lane keeping control (or LKAS control). Lane keeping control may be rephrased as lane departure suppression control.

When the lane change determiner 124 determines that it is necessary to change lanes, the lane change controller 134 executes control related to a lane change to cause the vehicle M to make the lane change to a desired adjacent lane according to automated driving. The control related to the lane change includes, for example, first control (preparation control) and second control (behavior control) for the lane change.

In the first control, for example, it is determined whether the vehicle M satisfies a condition for making the lane change based on the second control (a lane change execution condition). Examples of the lane change execution condition include a condition that there are no obstacles in a lane in a lane change destination, a condition that there is no interference with other vehicles in the vicinity when changing lanes, a condition that there is no lane change prohibition segment (that there are no road markings or signs prohibiting lane changes), a condition that a lane of a lane change destination is recognized (present), a condition that a yaw rate detected by the vehicle sensor 40 is less than a threshold value, a condition that a radius of curvature of the road during traveling is greater than or equal to a predetermined value, a condition that a task assigned to the driver is performed when the second control of the lane change is executed, a condition that the driver is not on a phone call, and the like. The tasks imposed on the driver may include, for example, one or both of a task in which the driver is monitoring the surroundings of the vehicle M (including the lane change destination) and a task in which the driver is gripping the steering wheel and may include other tasks. Whether or not the driver is monitoring the surroundings can be determined on the basis of an analysis processing result of an image captured by the in-cabin camera and whether or not the steering wheel has been gripped can be determined according to whether or not the grip has been detected by a sensor provided on the steering wheel. Other conditions may be included in the lane change execution conditions and some of the above-described conditions may be omitted.

In the second control, when it is determined that the lane change execution condition is satisfied in the first control, the lane change to the lane change destination is executed by controlling at least the steering between the steering and speed of the vehicle M. When the incoming call determiner 122 determines that there is an incoming call event during, before, or after the execution of the lane change control (the first control or the second control), the lane change controller 134 determines whether or not to make the lane change on the basis of a degree of progress of the control related to the lane change or the like.

In addition to the above-described control, the driving controller 130 may also perform ACC control in which the driver travels behind the preceding vehicle at a constant speed even though an accelerator operation or a brake operation is not performed while controlling the speed of the vehicle M so that a distance between the vehicle M and the preceding vehicle becomes a preset distance. When it is determined that the vehicle M may come into contact with a nearby physical object on the basis of the surrounding situation recognized by the recognizer 110, the driving controller 130 may execute CMBS control for displaying a warning sound or warning image or performing braking control (deceleration control). Whether or not to execute the various types of driving control described above may be controlled, for example, in accordance with an operation state of the switch (ON/OFF switch) 38 by the driver.

The HMI controller 140 notifies the occupant (or the driver) of predetermined information through the HMI 30. The predetermined information includes, for example, information about traveling of the vehicle M such as information about the state of the vehicle M and information about driving control. The information about the state of the vehicle M includes, for example, a speed, an engine speed, a shift position, and the like of the vehicle M. Information related to driving control includes, for example, a type of driving control that is being executed or can be executed, a situation of driving control, and the like. The predetermined information may include information for providing a notification of an incoming call, information for providing a notification of a state of calling, and the like. The predetermined information may include information about a current position and destination of the vehicle M, information about the remaining amount of fuel, and the like, and may include information that is not related to travel control of the vehicle M such as content (for example, a movie) stored in a storage medium such as a television program or a DVD.

For example, the HMI controller 140 may generate an image including the predetermined information described above and display the generated image on the display 34 of the HMI 30 or may generate a sound indicating the predetermined information and cause the generated sound to be output from the speaker 36 of the HMI 30. A timing when the sound is output is, for example, a timing when driving control starts or stops, a timing when an incoming call is received, a timing when the displayed image is switched, a timing when the vehicle M is in a predetermined state, or the like. The HMI controller 140 may output information received by the HMI 30 to the driving controller 130, the terminal device TD, or the like.

For example, the HMI controller 140 outputs information about the operation of the vehicle M according to the driving control and information about the incoming calls to the HMI 30 in a mode corresponding to a state of the driving control and notifies the occupant of the information. When an incoming call event for the driver of the vehicle M has occurred via the communication circuit, the HMI controller 140 performs control for outputting a ringing sound from the speaker 36, displaying information of the other party on the display 34, outputting the voice of the other party from the speaker 36 at the time of calling, transmitting the voice of the driver acquired by the microphone 32 to a terminal on the other side via the communication device 20 or the terminal device TD, or the like. The HMI controller 140 receives an operation on the switch 38 of the HMI 30 and controls the start of calling, the end of calling (hang up), or the like. Modes of these control types may differ in accordance with the state of the driving control (for example, various types of control patterns in the lane change to be described below).

The travel driving force output device 200 outputs a travel driving force (torque) for enabling the traveling of the vehicle M to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like mounted in the vehicle M. The ECU controls the above-described components in accordance with information input from the second controller 160 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the accelerator pedal of the driving operation element 80 so that brake torque according to a braking operation is output to each wheel. The brake device 210 may include a mechanism configured to transfer the hydraulic pressure generated according to an operation on the brake pedal to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel of the driving operation element 80 to change the direction of the steerable wheels.

[Lane Change Control and Incoming Call (Calling) Control]

Hereinafter, specific examples of lane change control and incoming call (calling) control in the embodiment will be described with reference to the drawings. Hereinafter, several patterns into which content of vehicle control based on the timing of an incoming call during, before, or after the execution of the lane change are divided will be described.

<First Control Pattern>

Figure 2:
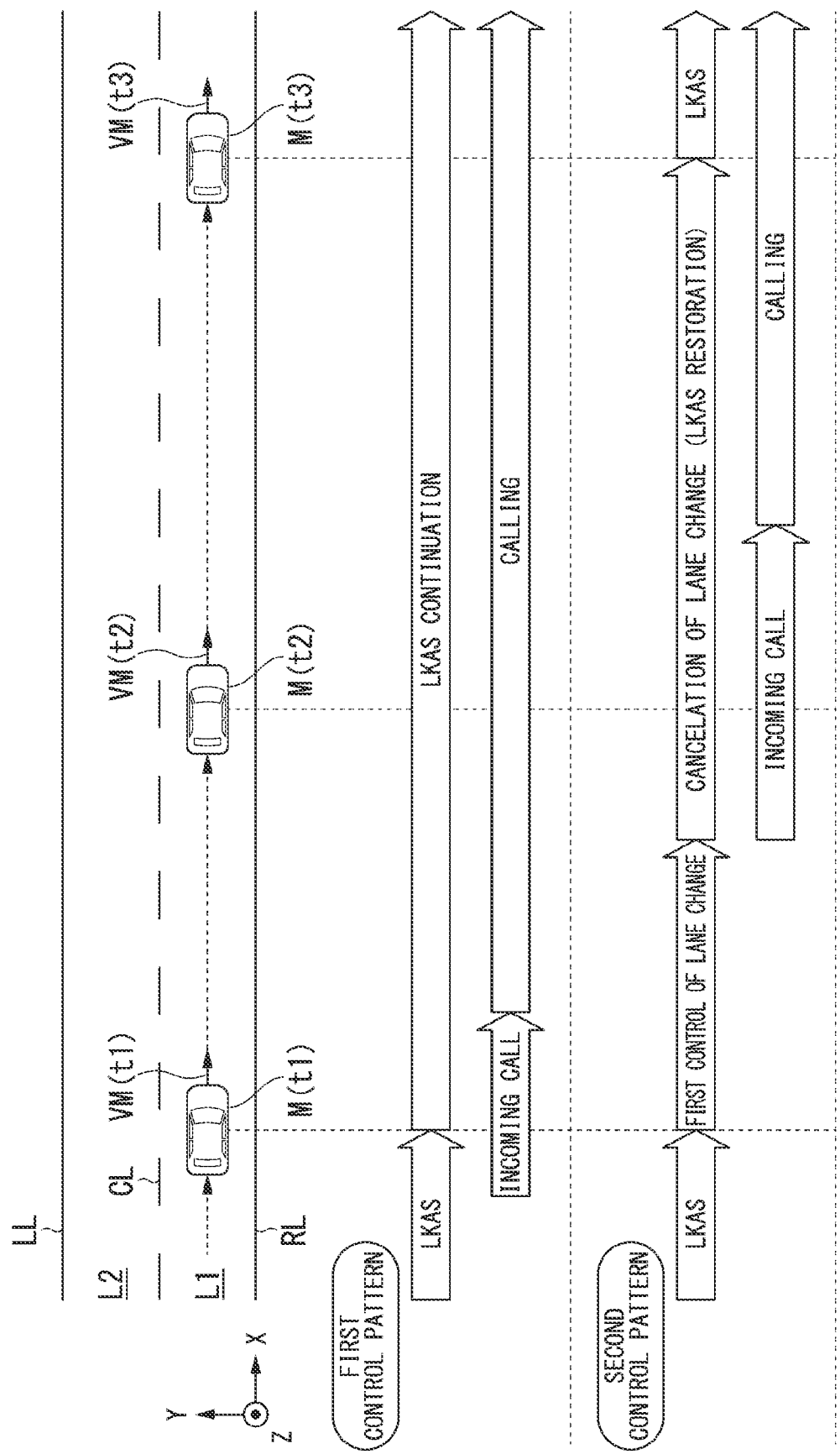
FIG. 2 is a diagram for describing first and second control patterns.
Figure 3:
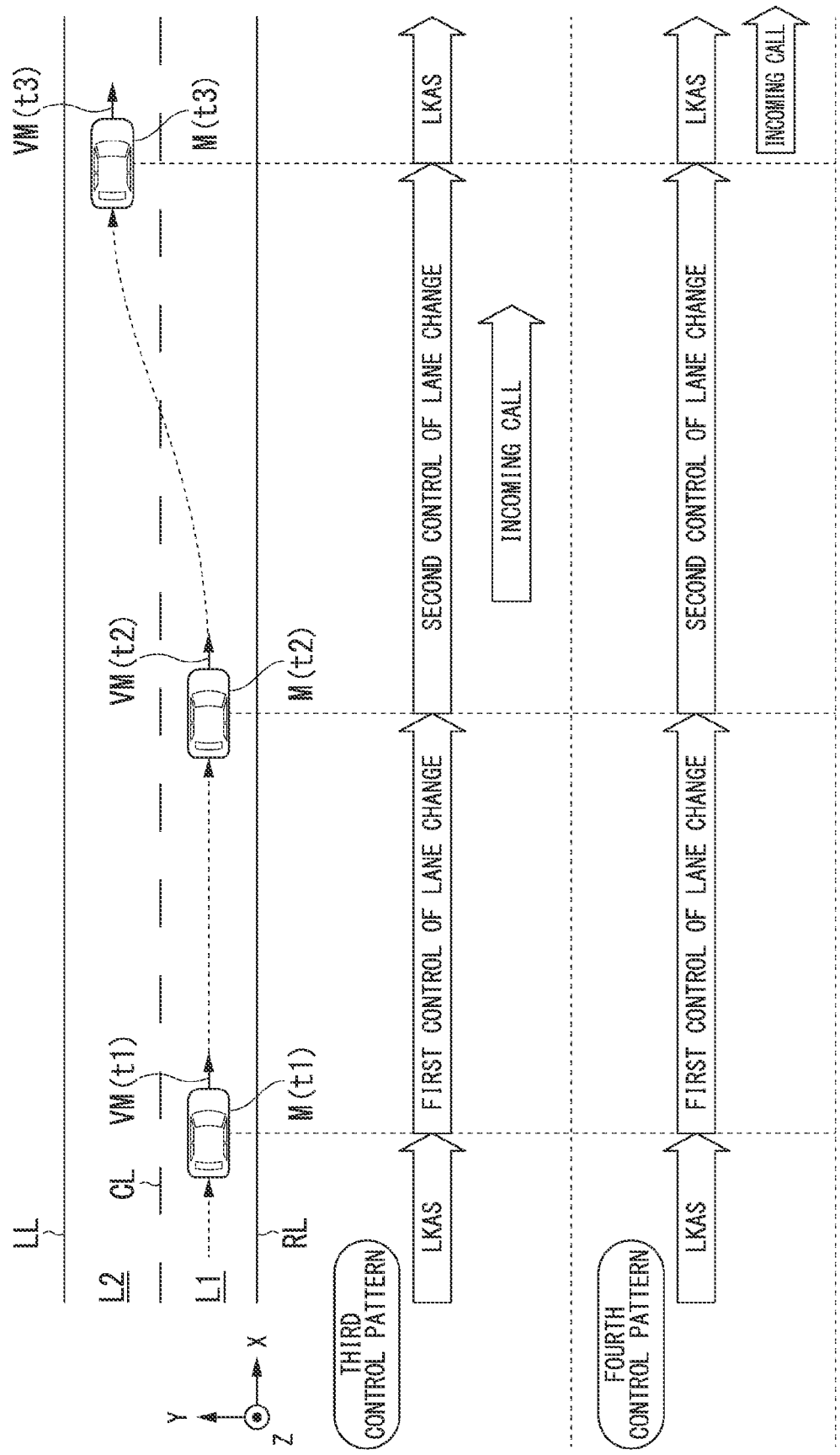
FIG. 3 is a diagram for describing third and fourth control patterns.

FIG. 2 is a diagram for describing first and second control patterns. In the example of FIG. 2, the vehicle M traveling at a speed VM in a lane L1 between two lanes L1 and L2 in which it can travel in the same direction (X-axis direction in FIG. 2) is shown. The lane L1 is defined by markings LL and CL and the lane L2 is defined by markings CL and RL. The marking CL is a marking indicating that a lane change between the lanes L1 and L2 is allowed. In the example of FIG. 3, the lane L1 is a travel lane in which the vehicle M is traveling and the lane L2 is an adjacent lane adjacent to the travel lane. In the following description, it is assumed that a reference position (for example, a position of the center of gravity) of the vehicle M at time t* is denoted by M(t*) and the speed is denoted by VM(t*). In the following description, it 5 is assumed that time t1 is the earliest and times t2 and t3 are later in that order. At a time before time t1, it is assumed that the lane keeping controller 132 executes the lane keeping control in which the vehicle M travels in the lane L1.

Time t1 is, for example, the time when the lane change request is received according to an operation on the turn signal switch by the driver of the vehicle M and is the time when the first control in the control (for example, the first control and the second control) related to the lane change from the lane L1 to the lane L2 is executed. Time t2 is the time at which the second control including the change in the behavior of the vehicle M is started if it is determined that the lane change execution condition is satisfied according to the first control. Time t3 is the time at which the lane change of the vehicle M to the lane L2 is completed when the second control is executed at time t2.

Here, the first control pattern is control in a scenario in which there is an incoming call event during the execution of lane keeping control (hereinafter referred to as LKAS control) before the control related to the lane change is executed. In the first control pattern, even if the driving controller 130 receives a lane change request from the driver at time t1, the lane change control is not executed (not received) and the LKAS control is continued. The HMI controller 140 performs control for receiving the driver's calling start operation for an incoming call and performing calling. Thereby, the driver can perform calling with the other party via the HMI 30 or the like.

<Second Control Pattern>

The second control pattern is control in a scenario in which there is an incoming call event in a situation in which the first control of the lane change is performed (before the completion of the first control and before the start of the second control) by receiving a lane change request from the driver at time t1. In the second control pattern, the lane change controller 134 suppresses the lane change because the second control of the lane change is not executed (it is canceled in the example of FIG. 2). In addition to the cancelation of the lane change, the suppression of the lane change may include keeping the control on standby so that the lane change control can be resumed immediately, and performing steering control for preventing a lane change, but moving the lateral position of the vehicle M in the travel lane (for example, returning to the center of the lane). In the driving controller 130, the LKAS control is restored by the lane keeping controller 132 and the LKAS control is executed after time t3. In the second control pattern, because the lane change is suppressed, the HMI controller 140 performs control for receiving the driver's calling start operation for an incoming call and performing calling.

<Third Control Pattern>

FIG. 3 is a diagram for describing third and fourth control patterns. FIG. 3 shows a control state related to the lane change at times t1, t2, and t3 as in FIG. 2. The third control pattern is control in a scenario in which there is an incoming call event in a state in which the lane change execution condition is satisfied in the first control of the lane change and the steering control of the vehicle M in the lane change is executed (a state before the lane change is completed) in the second control. In the third control pattern, the lane change controller 134 determines whether or not to make a lane change to the lane L2 (to continue the second control) on the basis of the degree of progress of the second control when there is an incoming call event. For example, the lane change controller 134 suppresses the lane change of the vehicle M if the degree of progress of the lane change is less than a threshold value when the incoming call event occurs. The degree of progress is set on the basis of, for example, the amount of change in the behavior of the vehicle M.

Figure 4:
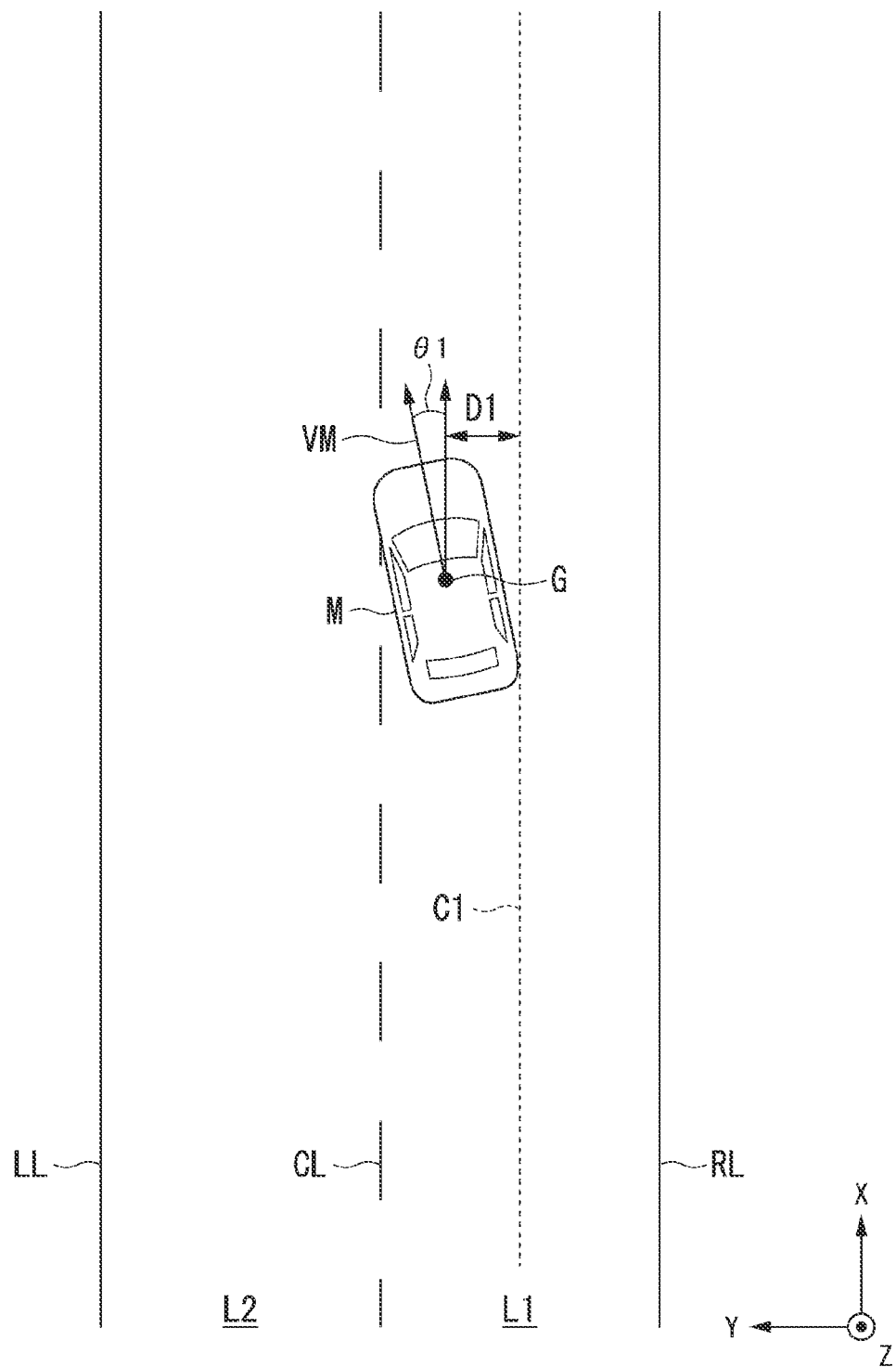
FIG. 4 is a diagram for describing a degree of progress of a lane change.

FIG. 4 is a diagram for describing the degree of progress of the lane change. In the example of FIG. 4, a state in which the steering control of the vehicle M is executed according to the second control is shown. The degree of progress of the lane change is set on the basis of, for example, the steering control degree for the lane change for the vehicle M. In this case, the degree of progress may be set in accordance with a deviation amount (lateral movement amount) D1 in a road width direction (lateral direction) from the center C1 of the lane L1 of the reference position (for example, the center of gravity G) of the vehicle M based on the steering control. The degree of progress may be set in accordance with a yaw rate θ1 (an angle (deviation angle) of the vehicle M in a front direction of the vehicle M with respect to the extension direction of the lane L1) or may be set on the basis of both thereof. Furthermore, when at least a part of the vehicle M is located in the lane L2, it may be determined that the degree of progress is greater than or equal to the threshold value.

Returning to FIG. 3, when the degree of progress is greater than or equal to the threshold value, the lane change controller 134 continuously executes the second control of the lane change. The HMI controller 140 does not perform control that enables calling even if there is an incoming call (the calling cannot be performed even if the switch for starting the calling is pressed during the incoming call). Also, at time t3, after the lane change is completed, LKAS control is executed by the lane keeping controller 132 so that the vehicle M travels in the lane L2.

In the third control pattern, when the degree of progress is less than the threshold value, the lane change controller 134 suppresses the lane change as in the second control pattern. In this case, in the driving controller 130, the LKAS control is restored by the lane keeping controller 132. In this case, the HMI controller 140 performs control for receiving the driver's calling start operation for the incoming call and performing the calling.

<Fourth Control Pattern>

The fourth control pattern is control in a scenario in which an incoming call is received after time t3. In the fourth control pattern, because the lane change to the lane L2 is completed, the HMI controller 140 receives the driver's calling start operation for an incoming call and performs control for performing calling.

[Content of which Occupant (Driver) is Notified]

Next, content of which the occupant (hereinafter assumed to be the driver as an example of the occupant) is notified during control in the control pattern described above will be specifically described. The image example shown below is generated by the HMI controller 140 and displayed on the display 34. The HMI controller 140 may generate a sound corresponding to the content displayed on the display 34 and cause the speaker 36 to output the sound.

Figure 5:
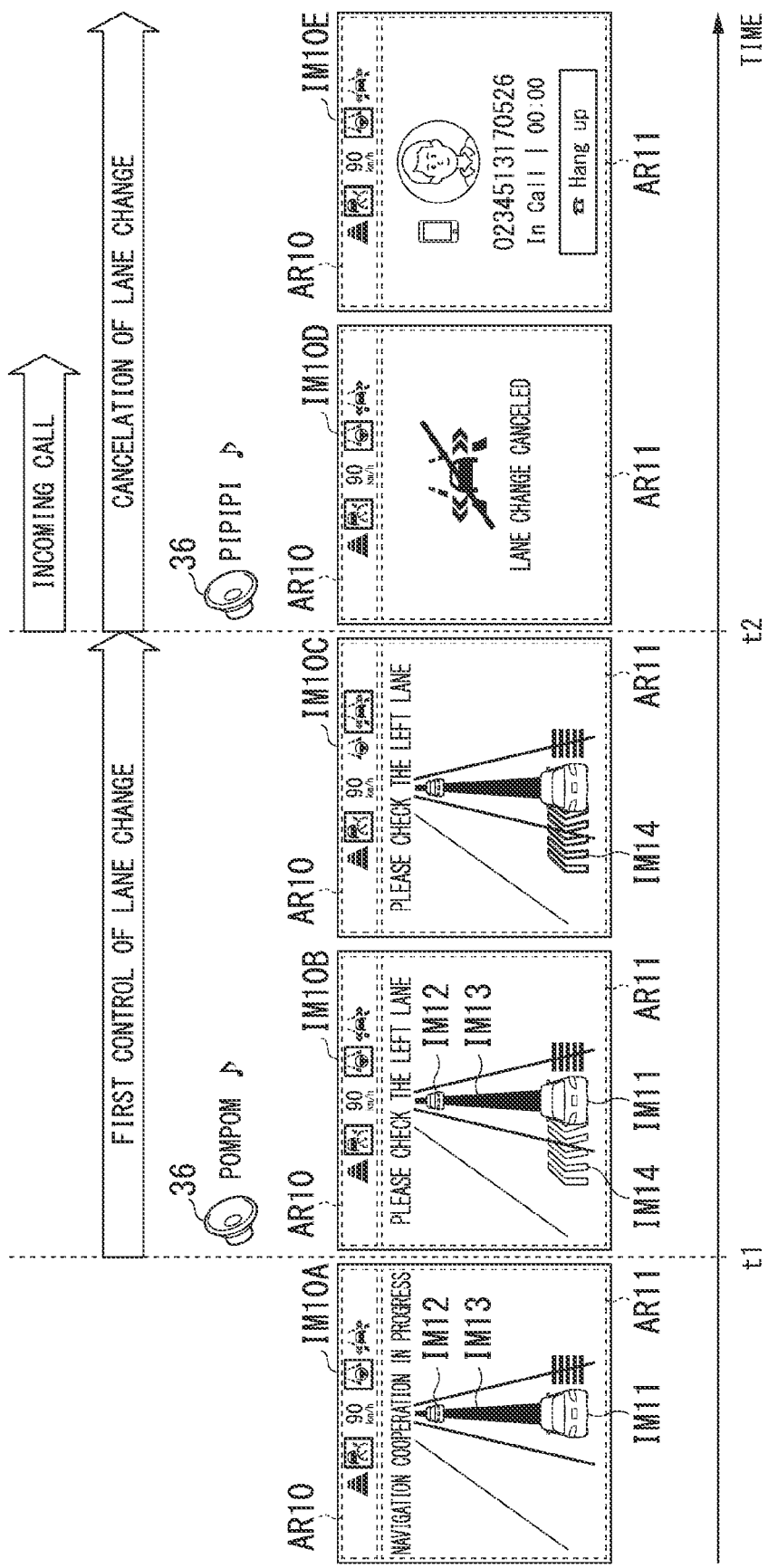
FIG. 5 is a diagram for describing content of which a driver is notified when the second control pattern is executed.

FIG. 5 is a diagram for describing content of which the driver is notified when the second control pattern is executed. In the example of FIG. 5, an image displayed when the number of displays 34 is one is shown. In the example of FIG. 5, a state in which an image sequentially transitions from an image IM10A to an image IM10B, an image IM10C, an image IM10D, and an image IM10E with the elapse of time is shown. Hereinafter, unless the images IM10A to IM10E shown in FIG. 5 are distinguished in the description, they will be simply collectively referred to as an "image IM10." Display modes such as content, colors, patterns, types, and layouts included in the image IM10 are not limited to the example of FIG. 5. It is assumed that the same is true for other image examples (and image transition examples) to be described below.

The image IM10 includes, for example, a driving control information display region AR10 and a notification information display region AR11. In the driving control information display region AR10, information about the driving control that the vehicle M is executing or can execute is displayed. Information about the driving control includes, for example, setting information of a distance between the vehicle and the preceding vehicle at the time of ACC execution, setting information of the vehicle speed set by the vehicle M, and information about an execution situation of the LKAS control or lane change control. For example, a mark, a symbol, or the like corresponding to the type of driving control is displayed in the driving control information display region AR10 and the display mode is changed with a color, pattern, lighting/flashing, or the like in accordance with whether or not it is being executed, such that it is possible to more clearly notify the driver of a state of driving control of the vehicle M.

In the notification information display region AR11 of the image IM10A, content of which the occupant is notified more specifically for the current situation of the vehicle M is shown. For example, in the notification information display region AR11, on an image resembling a road including a travel lane, an image IM11 resembling the vehicle M and an image IM12 resembling another vehicle located in a nearby area are displayed at positions associated with their position information (a position of the vehicle M on the road and relative positions of other vehicles when the vehicle M is designated as a reference). In the notification information display region AR11, an image IM13 indicating a future trajectory of the vehicle M, an image indicating a distance between the vehicle M and the preceding vehicle, and an image indicating text information related to control being executed may be displayed. In the example of FIG. 5, in the notification information display region AR11 of the image IM10A, information indicating that the vehicle M is traveling toward a destination in cooperation with the navigation device 50 in the vehicle control process (ACC control) is displayed.

When the first control of the lane change is executed at time t1, the image IM10B is displayed. In the notification information display region AR11 of the image IM10B, information for prompting the driver to monitor the surroundings of the vehicle M, such as "Please check the left lane," is displayed as text information different from the image IM10A. In addition to the images IM11 to IM13, in the notification information display region AR11, an image IM14 indicating a course change direction of the vehicle M in the road width direction is displayed. An image IM10B is an example of a "first image" indicating a lane change operation. The first image may be only an image displayed in the notification information display region AR11 among images displayed in the image IM10B. The HMI controller 140 may cause a sound indicating that the first control of the lane change is executed to be output from the speaker 36 in synchronization with the display of the image IM10B. By providing a notification of the image IM10B and the sound, it is possible to more clearly notify the driver that the vehicle M is executing control (especially the first control) related to the lane change.

When it is determined that the lane change execution condition is satisfied between time t1 and time t2, the HMI controller 140 causes an image as shown in the image IM10C to be displayed. This image is different from the image IM10B in that the image IM14 is more highlighted than when the image IM14 is displayed in the image IM10B. The highlighting includes, for example, various types of display modes such as displaying in a color that is easier for the driver to see or a conspicuous color, flashing, increasing brightness or luminance, making text bold, and surrounding a mark or symbol desired to be emphasized with a frame. In the driving control information display region AR10 of the image IM10C, a mark indicating lane keeping control is not highlighted and a mark of lane change control is highlighted as compared with the image IM10B. Thereby, it is possible to more clearly notify the driver that the second control of the lane change, including the steering control of the vehicle M, is executed.

Here, in the second control pattern, as described above, because there is an incoming call before time t2 is reached to start the second control of the lane change, the lane change controller 134 determines not to make the lane change and the lane change is suppressed. In this case, the HMI controller 140 switches an image from the displayed image IM10C to the image IM10D indicating that the lane change has been suppressed and causes the display 34 to display the image IM10D. The image IM10D is an example of a "second image." In the notification information display region AR11 of the image IM10D shown in FIG. 5, an image indicating a mark indicating that the lane change has been canceled or an image indicating text information is displayed instead of a first image indicating the operation of the vehicle M. The HMI controller 140 may cause the speaker 36 to output a sound indicating that the lane change has been canceled in synchronization with the timing at which the image IM10D is displayed. Thereby, it is possible to clearly notify the driver that the lane change has been canceled. The image IM10D may not include information displayed in the driving control information display region AR10 of FIG. 5.

For example, the HMI controller 140 causes the display 34 to display the image IM10E for providing a notification of the incoming call after the image IM10D is displayed for a predetermined time. The predetermined time is a period of time for allowing the driver to confirm content displayed in the image IM10D. The predetermined time may be a fixed period of time and may be set variably on the basis of the speed of the vehicle M, the road shape, and the degree of progress of the lane change. The image IM10E is an example of a "third image."

In the image IM10E, for example, an image indicating received information of the other party is displayed. The information displayed in the image IM10E, for example, may be acquired from the address information 152, or may be acquired from the terminal device TD during pairing communication. In the notification information display region AR11, a graphical user interface (GUI) switch for receiving an operation for starting or ending calling according to the driver's operation may be displayed. The image IM10E may not include information displayed in the driving control information display region AR10 of FIG. 5.

As described above, it is possible to more clearly notify the driver of the situation of the vehicle M by performing the transitioning and displaying of the images IM10A to IM10E in accordance with the situation of lane change control.

Figure 6:
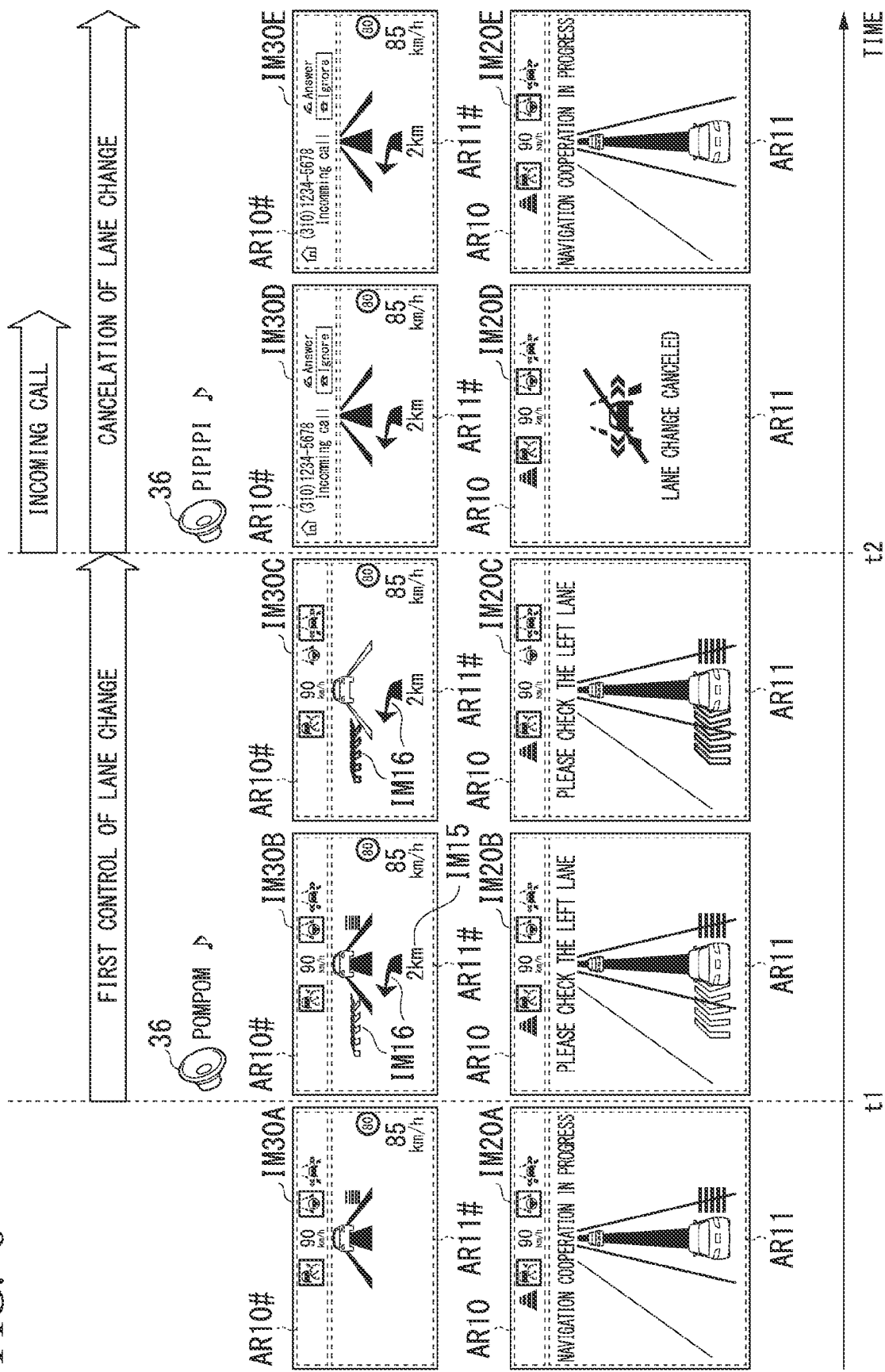
FIG. 6 is a diagram for describing content of which the driver is notified using a plurality of displays when the second control pattern is executed.

Here, when there are a plurality of displays 34, the screen transition corresponding to each of the plurality of displays 34 may be performed. FIG. 6 is a diagram for describing content of which the driver is notified using a plurality of displays when the second control pattern is executed. In the example of FIG. 6, images IM20A to IM20E displayed in the first display (main display) included in the display 34 and images IM30A to IM30E displayed in the second display (sub-display) are shown. It is assumed that the timing of the transition between the images IM20A to IM20E and the images IM30A to IM30E is synchronized. The first display is, for example, a meter display, and the second display is, for example, a display whose display region is more limited than the first display (for example, an HUD). The images IM20A to IM20E include a driving control information display region AR10 and a notification information display region AR11 and the images IM30A to IM30E include a driving control information display region AR10 # and a notification information display region AR11 #. Hereinafter, the differences from the transitions of the images IM10A to IM10E shown in FIG. 5 will be mainly described.

At a time before time t1, content similar to that of the image IM10A is displayed in the image IM20A. The information displayed in the driving control information display region AR10 of the image IM10A is partially omitted and displayed in the driving control information display region AR10 # of the image IM30A and the information displayed in the notification information display region AR11 of the image IM10A is simplified and displayed in the notification information display region AR11 #. In the notification information display region AR11, information about a road sign corresponding to the travel lane of the vehicle M recognized by the recognizer 110 (for example, information about a speed limit) and information about the speed VM of the vehicle M may be displayed.

At time t1, content similar to that of the images IM10B to IM10C is displayed in the images IM20B to IM20C. On the other hand, in the content displayed in the notification information display region AR11 # of the images IM30B to IM30C, in addition to the content displayed in the notification information display region AR11 # of the image IM30A, an image IM15 indicating the remaining distance until a lane change or an image IM16 indicating a course change direction is displayed. In the image IM30C, at least a part of the image IM16 indicating the course change direction is highlighted as compared with the image IM30B. In the driving control information display region AR10 # of the image IM30C, as compared with the driving control information display region AR10 # of the image IM30B, the mark indicating lane keeping control is not highlighted and the mark of lane change control is highlighted.

Here, in the second control pattern, because there is an incoming call before time t2 at which the second control of the lane change is started is reached, the lane change controller 134 determines not to make the lane change and the lane change is suppressed. In this case, the HMI controller 140 switches the image from the image (first image) IM20C being displayed in the first display to the image (second image) IM20D indicating that the lane change has been suppressed and causes the image IM20D to be displayed. Furthermore, the HMI controller 140 switches the image from the image (first image) IM30C being displayed in the second display to the image (third image) IM30D including the image for providing a notification of calling and causes the image IM30D to be displayed.

In the image IM20D shown in FIG. 6, content similar to that of the image IM10D is displayed. In the driving control information display region AR10 # of the image IM30D, information for providing a notification of an incoming call is displayed instead of the information currently displayed in the driving control information display region AR10 #. The information for providing the notification of the incoming call includes, for example, the telephone number of the other party and/or information indicating that the incoming call is in progress. Furthermore, a GUI switch that receives the driver's operation for starting or ending calling may be displayed in the driving control information display region AR10 #.

After causing the images IM20D and IM30D to be displayed for a predetermined period of time, the HMI controller 140 causes the first display to display the image IM20E and causes the second display to display the image IM30E. Content of the image IM20E is similar to that of the image IM20A. Content of the image IM30E is similar to that of the image IM30D. As shown in FIG. 6, when there are a plurality of displays, a notification of more appropriate information can be provided to the driver in accordance with a position of each display, a display region, or the like. Even if predetermined information is displayed on a plurality of displays, the HMI controller 140 may cause an identification sound to be output from the speaker 36 at the start or cancelation of control related to the lane change, at the time of an incoming call, or at the timing of switching the displayed image.

Figure 7:
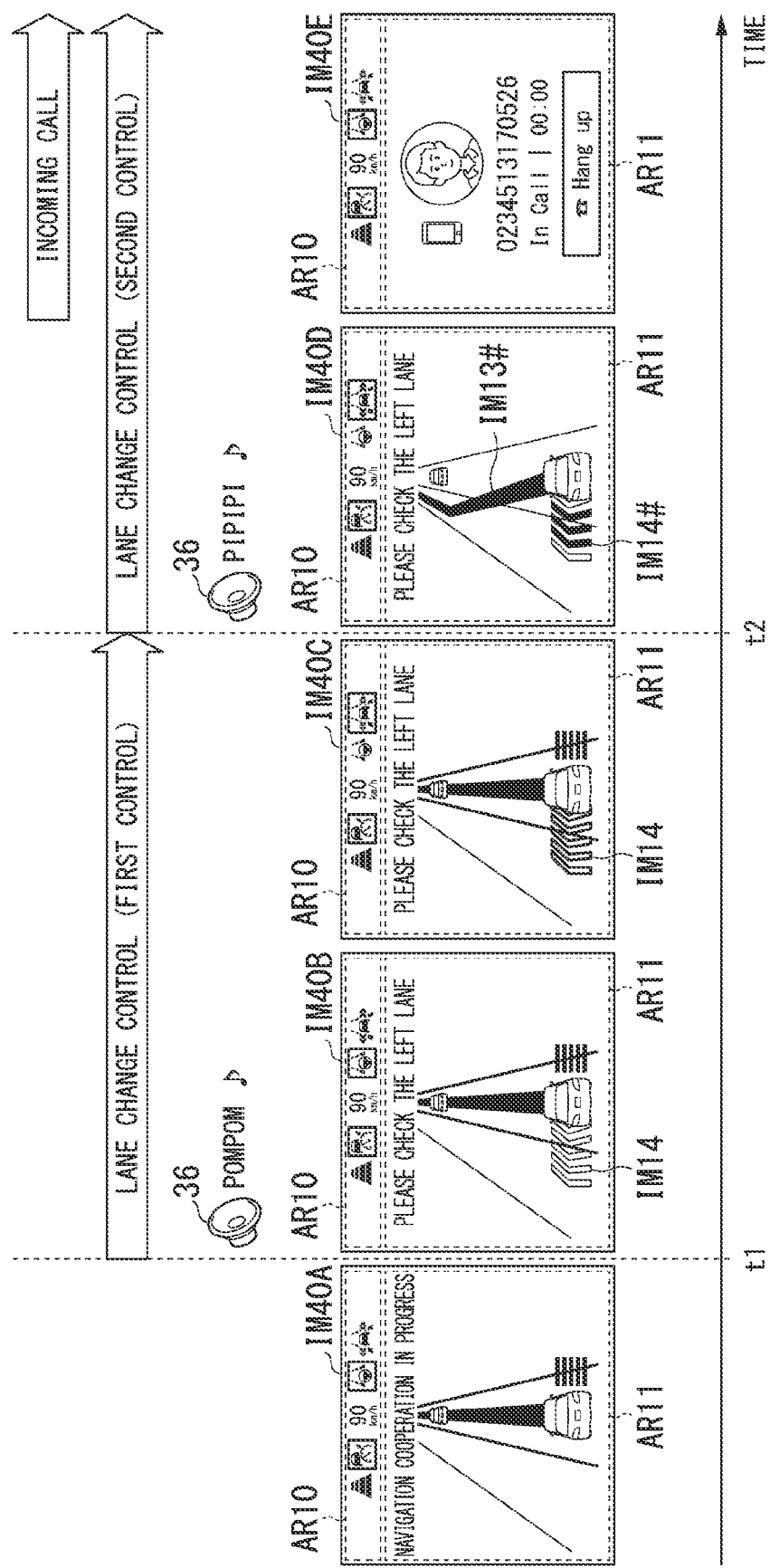
FIG. 7 is a diagram for describing content of which the driver is notified when the third control pattern is executed.

FIG. 7 is a diagram for describing content of which the driver is notified when the third control pattern is executed. In the example of FIG. 7, the images IM40A to IM40E displayed when the number of displays 34 is one is shown as in the example of FIG. 5. When the images IM40A to IM40E are compared with the images IM10A to IM10E described above, the image IM10D and the image IM40D are different. The image IM10E and the image IM40E have similar content to be displayed, but have different display timings. Therefore, hereinafter, the above differences will be mainly described.

In the third control pattern, the lane change controller 134 continuously executes lane change control without suppressing the lane change when the degree of progress is greater than or equal to the threshold value even if there is an incoming call during the execution of the second control of the lane change. Therefore, at the time of executing the second control (time t2), the HMI controller 140 causes an image IM13 # changed in a trajectory corresponding to the change of the course of the vehicle M from the travel lane to the adjacent lane to be displayed as shown in the notification information display region AR11 of the image IM40D. Furthermore, the HMI controller 140 causes a moving image IM14 # including a pattern or color that flows in the course change direction with the elapse of time to be displayed for the image IM14 indicating the course change direction of the vehicle M in the road width direction. Thereby, it is possible to more accurately notify the driver that the vehicle M is executing the second control (steering control) by changing lanes.

The HMI controller 140 causes the image IM10E to be displayed after the image IM10D indicating that the lane change is suppressed (canceled) is displayed for a predetermined time in the second control pattern, but causes an image (third image) IM40E to be displayed at a timing when there is an incoming call after the image IM40D is displayed (before the end of the second control) in the third control pattern. In the driving control information display region AR10 of the image IM40E, an indication indicating the lane change continues to be highlighted. Thereby, it is possible to make it easier for the driver to ascertain that the lane change is in a continuous state and that there has been an incoming call.

Figure 8:
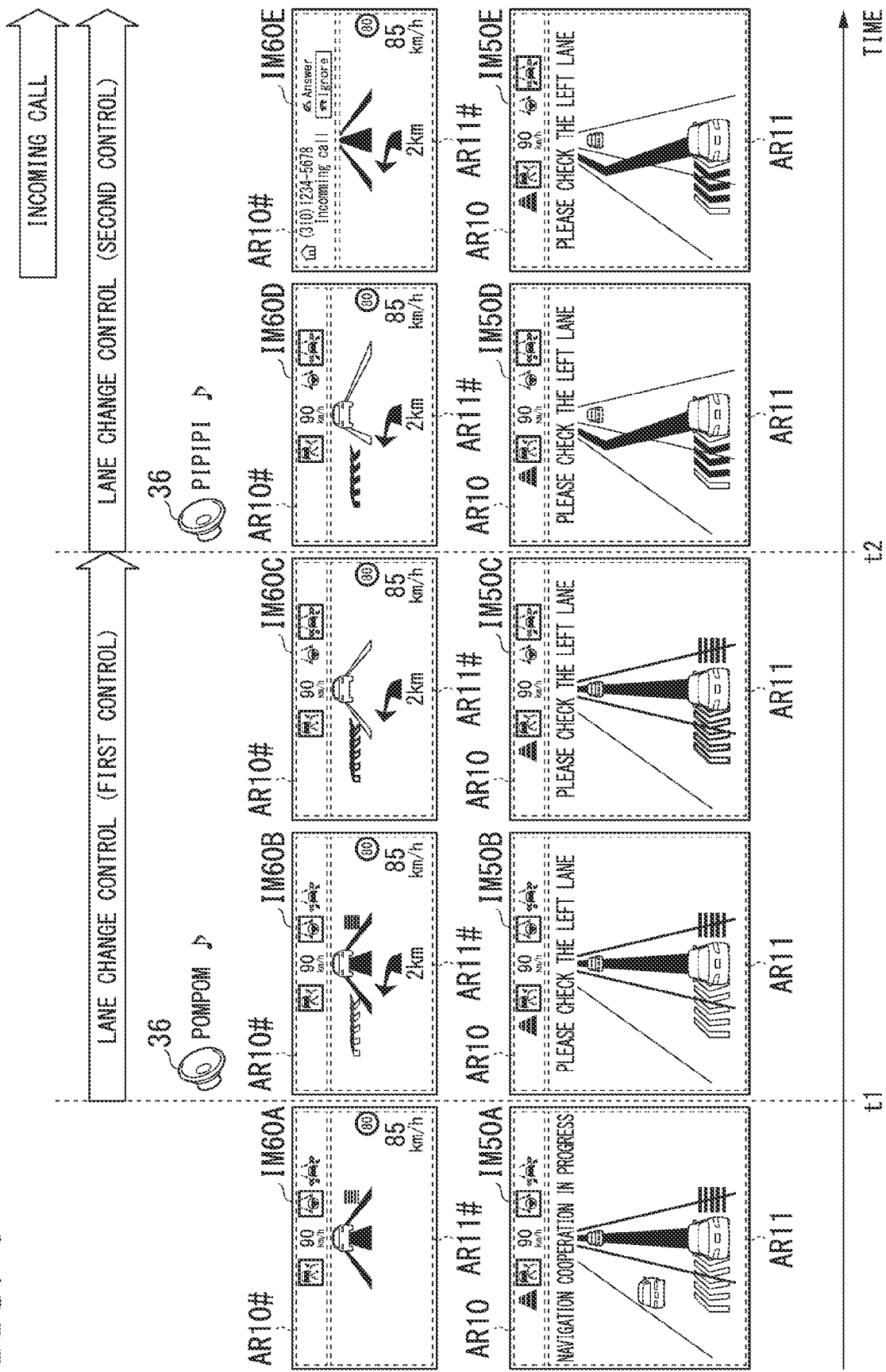
FIG. 8 is a diagram for describing content of which the driver is notified using a plurality of displays when the third control pattern is executed.

FIG. 8 is a diagram for describing content whose notification is provided to the driver using a plurality of displays when the third control pattern is executed. Images IM50A to IM50E displayed in the first display (main display) included in the display 34 and images IM60A to IM60E displayed in the second display (sub-display) are shown. It is assumed that the images IM50A to IM50E and the images IM60A to IM60E transition synchronously. When the images IM50A to IM50E are compared with the images IM20A to IM20E, an image IM20D and an image IM50D are different. When the images IM60A to IM60E are compared with the images IM30A to 30E, the image IM30D and the image IM60D are different. Therefore, hereinafter, the above differences will be mainly described.

In the third control pattern, because the second process of the lane change is executed at time t2, the image displayed in the first control (the first image indicating the operation of the vehicle M) is continuously displayed in the image IM50D. This image is continued at the timing of the image IM50E. In the image IM60D, because it is a state before the incoming call, the image displayed in the notification information display region AR11 # in the first control is continuously displayed. Also, a third image indicating information for providing a notification of the incoming call is displayed in the driving control information display region AR10 # of the image IM60E at the timing of the incoming call. In the third control pattern, the HMI controller 140 may also cause an identification sound to be output from the speaker 36 at the start or cancelation of control related to the lane change, at the time of an incoming call, or at the timing of switching the displayed image. Thus, in the third control pattern, appropriate information can also be displayed using a plurality of displays and the driver can be notified of more appropriate information. In the third control pattern, when the degree of progress of the lane change is greater than or equal to the threshold value, the HMI controller 140 may transmit information indicating that it is not possible to respond to a call immediately to the terminal device TD that has made the call because the vehicle M in driving S is changing lanes. Thereby, the other party can ascertain the driver's situation.

In the case of the first control pattern, an image is switched to the image IM10E (the images IM20E and IM30E when the first and second displays are provided) and displayed at the time of an incoming call from a state in which the image IM10A (the images IM20A and IM30A when the first and second displays are provided) is displayed. After the calling is terminated, the image IM10A (the images IM20A and IM30A when the first and second displays are provided) is displayed again. In the case of the fourth control pattern, an image indicating the operation of the vehicle M (LKAS control or ALC control) is displayed from before time t1 to time t3, the image is switched to the image IM10E (the images IM20E and IM30E when the first and second displays are provided) and displayed at the time of the incoming call after time t3, and the image IM10A (the images IM20A and IM30A when the first and second displays are provided) is displayed again after the call is terminated. Thereby, in accordance with each control pattern, the driver can be notified of more appropriate information in an appropriate mode.

When driving control other than the lane change (for example, LKAS control or ACC control) is being executed, the automated driving control device 100 may perform calling control at a timing when there is an incoming call. In this case, the HMI controller 140 may notify the driver that the lane change according to the driving control of the vehicle M cannot be made during calling.

MODIFIED EXAMPLES

In the embodiment, the lane change controller 134 may differentiate the content of the lane change control in accordance with a necessity determination condition in which the lane change determiner 124 determines whether or not it is necessary to make a lane change. For example, lane change control when a lane change request is received by the driver has been described in the above-described embodiment, but the lane change controller 134 is executed until the lane change to the lane L2 is completed without suppressing the lane change even if the degree of progress of the lane change is less than the threshold value when there is an incoming call before the second control is executed in a case where the lane change for guiding the vehicle M to a route for the destination is made on the basis of a position of the vehicle M, a shape of the road while traveling, or the like. In this case, vehicle control is performed in a pattern substantially similar to the third control pattern, not the second control pattern. Thereby, it is possible to suppress a situation in which the vehicle M cannot reach the destination or a detour. Therefore, more appropriate vehicle control can be performed in accordance with a necessity determination condition for a lane change.

In the embodiment, the HMI controller 140 may perform control in which calling can be performed (calling control) even if the second control is being executed (regardless of the degree of progress of the lane change) when there is an incoming call from the other party having a high degree of importance (the other party having a degree of importance higher than or equal to a threshold value). The degree of importance may be, for example, an index value indicating a degree of urgency. For example, the HMI controller 140 performs calling control when priority included in address information 152 is greater than or equal to a threshold value or when there is an incoming call from a telephone number for which a high degree of urgency is set in advance (calling is not suppressed). When the call time at the time of the incoming call or the number of calls from the same number (the other party) at a predetermined time is greater than or equal to a predetermined value, the HMI controller 140 may perform calling control by determining that the degree of importance is greater than or equal to the threshold value. In the case of the calling control when the degree of importance is greater than or equal to the threshold value, the HMI controller 140 may be in a state in which calling can be performed even if the driver does not perform a switch operation to start the calling (a state in which the voice of a communication partner is output from the speaker 36 and the driver's voice acquired from the microphone 32 is transmitted to the communication partner). Thereby, more appropriate calling control can be performed according to the degree of importance of the calling partner.

Although the case where there is an incoming call at the time of lane change control has been described in the above-described embodiment, it may be determined whether or not to make a lane change in accordance with a degree of progress of the lane change when there is an outgoing call (an outgoing call event) even if the driver makes a call (calls the other party) for calling with the outside at the time of lane change control. For example, the lane change controller 134 suppresses the lane change of the vehicle M if the degree of progress of the lane change is less than the threshold value when there is an outgoing call event. The threshold value in this case may be different from the threshold value at the time of the incoming call event. Thereby, more appropriate vehicle control can be performed in accordance with the state of the vehicle M at the time of each of an outgoing call and an incoming call.

In the embodiment, the lane change controller 134 may perform control for preventing a lane change when a preset high-priority function intervenes before starting the second control. After starting the second control, the HMI controller 140 may allow switching of the display content or interrupting of other notifications according to an operation of the occupant (lane change control is also continued in this case).

[Processing Flow]

Hereinafter, a process executed by the automated driving control device 100 of the embodiment will be described. Hereinafter, processes mainly including a lane change and incoming call control among processes to be executed by the automated driving control device 100 will be described. The process shown below may be iteratively executed at a predetermined timing or a predetermined interval. It is assumed that LKAS control for the vehicle M is executed by the lane keeping controller 132 before the execution of the lane change. In the following process, a process in which the number of displays 34 is one will be described.

Figure 9:
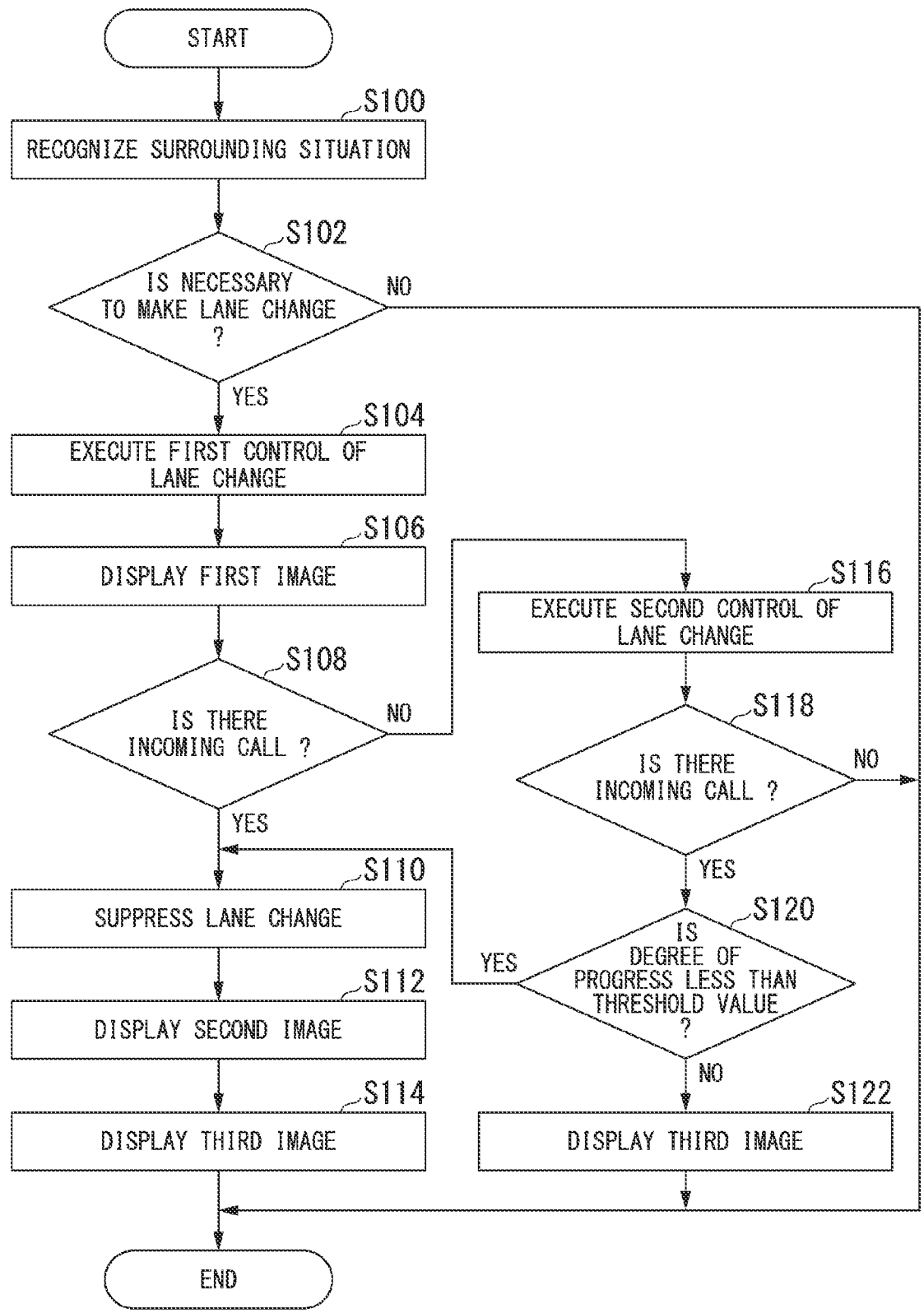
FIG. 9 is a flowchart showing an example of a process executed by an automated driving control device of the embodiment.

FIG. 9 is a flowchart showing an example of a process executed by the automated driving control device 100 of the embodiment. In the example of FIG. 9, the recognizer 110 recognizes a surrounding situation of the vehicle M (step S100). Subsequently, the lane change determiner 124 determines whether or not it is necessary to make a lane change on the basis of the surrounding situation, the occupant's operation content, and the like (step S102). When it is determined that it is necessary to make a lane change, the lane change controller 134 executes the first control of the lane change. Subsequently, the HMI controller 140 causes the display 34 to display a first image indicating the operation of the vehicle M (step S106). The first image may be displayed before the process of FIG. 9 starts.

Subsequently, the incoming call determiner 122 determines whether or not there is an incoming call during the execution of the first control (step S108). When it is determined that there is an incoming call, the lane change controller 134 suppresses the lane change to an adjacent lane (step S110). Subsequently, the HMI controller 140 switches an image from the displayed first image to the second image indicating that the lane change has been suppressed and causes the display 34 to display the second image (step S112). Subsequently, when a predetermined time has elapsed after the display of the second image, the HMI controller 140 switches the image from the second image to the third image for providing a notification of the incoming call and causes the display 34 to display the third image (step S114).

When it is determined that there is no incoming call during the execution of the first control in the processing of step S108, the lane change controller 134 executes the second process of the lane change after the end of the first control (after the lane change execution condition is satisfied) (step S116). Subsequently, the incoming call determiner 122 determines whether or not there is an incoming call during the execution of the second control (step S118). When it is determined that there is an incoming call, the lane change controller 134 determines whether or not the degree of progress of the lane change is less than a threshold value (step S120). When the degree of progress is less than the threshold value, the automated driving control device 100 performs the processing of steps S110 to S114. When it is determined that the degree of progress is not less than the threshold value (or is greater than or equal to the threshold value), the HMI controller 140 switches the image from the first image displayed on the display 34 to the third image and causes the third image to be displayed (step S122). Thereby, the process of the present flowchart is terminated. In the processing of step S102, when it is determined that it is not necessary to make a lane change, the present flowchart ends. In this case, the first image indicating the operation of the vehicle M (lane keeping control operation) may be continuously displayed. In the processing of step S118, when it is determined that there is no incoming call, the process of the present flowchart ends.

According to the above-described embodiment, the automated driving control device (an example of the vehicle control device) 100 includes the recognizer 110 configured to recognize a surrounding situation of the vehicle M; the driving controller 130 configured to execute driving control for controlling one or both of steering and a speed of the vehicle M on the basis of the surrounding situation; the incoming call determiner 122 configured to determine presence or absence of an incoming call for an occupant of the vehicle M; and the HMI controller (an example of a notification controller) 140 configured to notify the occupant of information about an operation of the vehicle M based on the driving control and information about the incoming call in a mode corresponding to a state of the driving control, wherein the driving controller 130 determines whether or not to make a lane change from a travel lane of the vehicle M to an adjacent lane on the basis of a degree of progress of the control related to the lane change if the incoming call is present when control related to the lane change of the vehicle M is executed, whereby a vehicle control process can be more appropriately performed if there is an incoming call for an occupant during the lane change of the vehicle.

Specifically, in the embodiment, a control process for suppressing the lane change when there is an incoming call before the steering control (second control) related to the lane change is started and inserting an incoming call screen into the lane change display when there is an incoming call at the time of the lane change is performed. Furthermore, in the embodiment, the display mode is changed in accordance with the case where an incoming call has been received before and after the steering control or a case where it is displayed on a single screen or a plurality of screens. Thereby, it is possible to more accurately notify the occupant of the state of the vehicle and it is possible to allow the occupant to perform a process of appropriately monitoring surroundings (safety checks) according to a lane change.

According to the embodiment, by causing a displayed image to transition in accordance with a driving control state and an incoming call timing, it is possible to notify the occupant of more appropriate information while ensuring the continuity of the displayed content.

The embodiment described above can be represented as follows.

A vehicle control device including:
a storage medium storing computer-readable instructions; and
a processor connected to the storage medium, the processor executing the computer-readable instructions to:
recognize a surrounding situation of a vehicle;
execute driving control for controlling one or both of steering and a speed of the vehicle on the basis of the surrounding situation;
determine presence or absence of an incoming call for an occupant of the vehicle;
notify the occupant of information about an operation of the vehicle based on the driving control and information about the incoming call in a mode corresponding to a state of the driving control; and
determine whether or not to make a lane change from a travel lane of the vehicle to an adjacent lane on the basis of a degree of progress of the control if the incoming call is present when control related to the lane change of the vehicle is executed.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:
a recognizer configured to recognize a surrounding situation of a vehicle;
a driving controller configured to execute driving control for controlling one or both of steering and a speed of the vehicle on the basis of the surrounding situation;
an incoming call determiner configured to determine presence or absence of an incoming call for an occupant of the vehicle; and
a notification controller configured to notify the occupant of information about an operation of the vehicle based on the driving control and information about the incoming call in a mode corresponding to a state of the driving control,
wherein the driving controller determines whether or not to make a lane change from a travel lane of the vehicle to an adjacent lane on the basis of a degree of progress of the control if the incoming call is present when control related to the lane change of the vehicle is executed.

2. The vehicle control device according to claim 1, wherein the driving controller suppresses the lane change of the vehicle if the degree of progress is less than a threshold value when the incoming call is present.

3. The vehicle control device according to claim 2, wherein the degree of progress is set on the basis of an amount of change in behavior of the vehicle.

4. The vehicle control device according to claim 2, wherein the degree of progress is set on the basis of a degree of steering control for the lane change.

5. The vehicle control device according to claim 1, wherein the notification controller
causes a display to display a third image for providing a notification of the incoming call after an image is switched from a first image indicating the operation of the vehicle to a second image indicating that the lane change is suppressed and the second image is displayed when the driving controller determines that the lane change is not made after the first image is displayed on the display according to control related to the lane change of the vehicle, and
switches the image from the first image to the third image when it is determined that the lane change is made to cause the display to display the third image.

6. The vehicle control device according to claim 1, wherein the notification controller provides a notification of an image indicating the operation of the vehicle and an image for providing a notification of the incoming call using a plurality of displays including a first display and a second display, and
wherein, when the driving controller determines not to make the lane change after a first image indicating the operation of the lane change is displayed on the first display and the second display, the notification controller causes the first display to display a second image indicating that the lane change is suppressed and causes the second display to display a third image for providing a notification of the incoming call.

7. The vehicle control device according to claim 1, wherein the notification controller provides a notification of an image indicating the operation of the vehicle and an image for providing a notification of the incoming call using a plurality of displays including a first display and a second display, and
wherein, when the driving controller determines to make the lane change after a first image indicating the operation of the lane change is displayed on the first display and the second display, the notification controller causes the first display to continuously display the first image and causes the second display to display a third image for providing a notification of the incoming call.

8. The vehicle control device according to claim 2, wherein the driving controller does not suppress the lane change even if the degree of progress is less than a threshold value when the incoming call is present in a case where the vehicle is guided along a route for a destination and makes the lane change.

9. The vehicle control device according to claim 2, wherein the notification controller performs calling control for the incoming call regardless of the degree of progress when a degree of importance of the incoming call is greater than or equal to a threshold value.

10. A vehicle control method comprising:
recognizing, by a computer, a surrounding situation of a vehicle;
executing, by the computer, driving control for controlling one or both of steering and a speed of the vehicle on the basis of the surrounding situation;
determining, by the computer, presence or absence of an incoming call for an occupant of the vehicle;
notifying, by the computer, the occupant of information about an operation of the vehicle based on the driving control and information about the incoming call in a mode corresponding to a state of the driving control; and
determining, by the computer, whether or not to make a lane change from a travel lane of the vehicle to an adjacent lane on the basis of a degree of progress of the control if the incoming call is present when control related to the lane change of the vehicle is executed.

11. A computer-readable non-transitory storage medium storing a program for causing a computer to:
recognize a surrounding situation of a vehicle;
execute driving control for controlling one or both of steering and a speed of the vehicle on the basis of the surrounding situation;
determine presence or absence of an incoming call for an occupant of the vehicle;
notify the occupant of information about an operation of the vehicle based on the driving control and information about the incoming call in a mode corresponding to a state of the driving control; and
determine whether or not to make a lane change from a travel lane of the vehicle to an adjacent lane on the basis of a degree of progress of the control if the incoming call is present when control related to the lane change of the vehicle is executed.

* * * * *